April 15, 1969　　L. C. GREGORY ET AL　　3,439,268
CIRCUIT EMPLOYING MAGNETIC CORES FOR TESTING THE PRESENCE
AND ABSENCE OF ELECTRICAL CONNECTIONS
Filed June 29, 1966　　　　　　　　　　　　　　Sheet __1__ of 3

INVENTORS
L. C. GREGORY
J. T. HAYWOOD

BY *S. Gundersen*

ATTORNEY

United States Patent Office

3,439,268
Patented Apr. 15, 1969

3,439,268
CIRCUIT EMPLOYING MAGNETIC CORES FOR TESTING THE PRESENCE AND ABSENCE OF ELECTRICAL CONNECTIONS
Leroy C. Gregory, Greensboro, and John T. Haywood, Burlington, N.C., assignors to Western Electric Company, Incorporated, New York, N.Y., a corporation of New York
Filed June 29, 1966, Ser. No. 561,431
Int. Cl. G01r 15/12
U.S. Cl. 324—73
3 Claims

ABSTRACT OF THE DISCLOSURE

A testing circuit for detecting wiring errors on terminal boards has separate magnetic cores, each having a write winding, a read winding and a monitor winding associated with each terminal. A pulse is applied to a selected terminal to pass current through all write windings electrically connected to the selected terminal. Next, pulses are selectively applied to read windings on all cores which are supposed to be electrically connected to the selected terminal to check for erroneous absence of an electrical connection. Finally, a pulse is applied to a scan winding serially connected through all the cores to check for the erroneous presence of an electrical connection.

---

This invention relates to a circuit for testing a plurality of electrical connections, and more particularly, to an electrical testing circuit for detecting errors in electrical connections made between a plurality of terminals.

In the manufacture of complex electronic equipment, it is necessary to detect errors in electrical connections which are made between large numbers of terminals. Heretofore, the testing of such a large number of electrical connections has been a time consuming process requiring skilled operators and inefficient complex testing equipment.

An object of the present invention is a circuit for efficiently and rapidly testing a plurality of electrical connections.

Another object of the invention is a circuit for testing a plurality of electrical connections made between a plurality of terminals wherein a minimum amount of electrical power is used.

A further object of the invention is a circuit for testing a plurality of electrical connections wherein storage devices are used to sense errors in the plurality of electrical connections.

A still further object of the invention is a circuit for testing both the presence of electrical connections between terminals and the absence of electrical connections between terminals.

With these and other objects in view, the present invention contemplates separate memory devices connected to each of a plurality of terminals. A pulse is applied to one of the terminals to store information in all the memory devices electrically connected to that terminal. The information in the memory devices is then read out to sense both the absence of an electrical connection and the presence of an electrical connection.

In an embodiment of the invention, each memory device includes a magnetic core in which the magnetic state of the core is changed when an electrical pulse is applied through an electrical connection to the terminal associated with the core. Certain of the cores are sequentially pulsed to revert back to their original magnetic state to determine if electrical connections are erroneously absent. A winding serially connected through all of the cores is then pulsed to sense any cores associated with terminals to which electrical connections are erroneously present.

A complete understanding of this invention may be had by reference to the following detailed description when considered in conjunction with the accompanying drawings, wherein.

Figure 1:
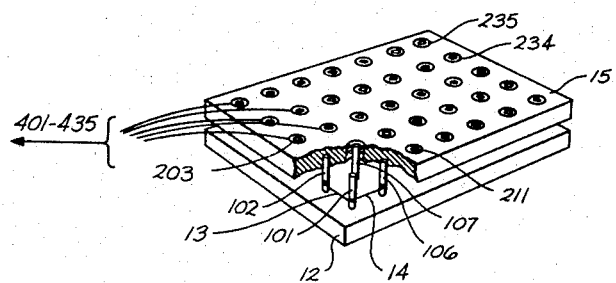
FIG. 1 shows a terminal board and a connector block for connecting wires to each of the terminals on the terminal board.

Referring first to FIG. 1, there is shown a terminal board or support 12 upon which thirty-five terminals 101, 102, . . . , 106, 107, etc. are mounted. Various wire connections are made between these terminals. The electrical testing circuit shown in FIGS. 3 and 4 checks these wiring connections. For example, the terminal 101 is connected to the terminal 102 by the wire 13 and to the terminal 106 by the wire 14. The terminal 107 and the other terminals are not electrically connected to the terminal 101. The testing circuit checks that the terminals 102 and 106 are electrically connected to the terminal 101 and that the terminal 107 and the other terminals are not electrically connected to the terminal 101.

Figure 3:
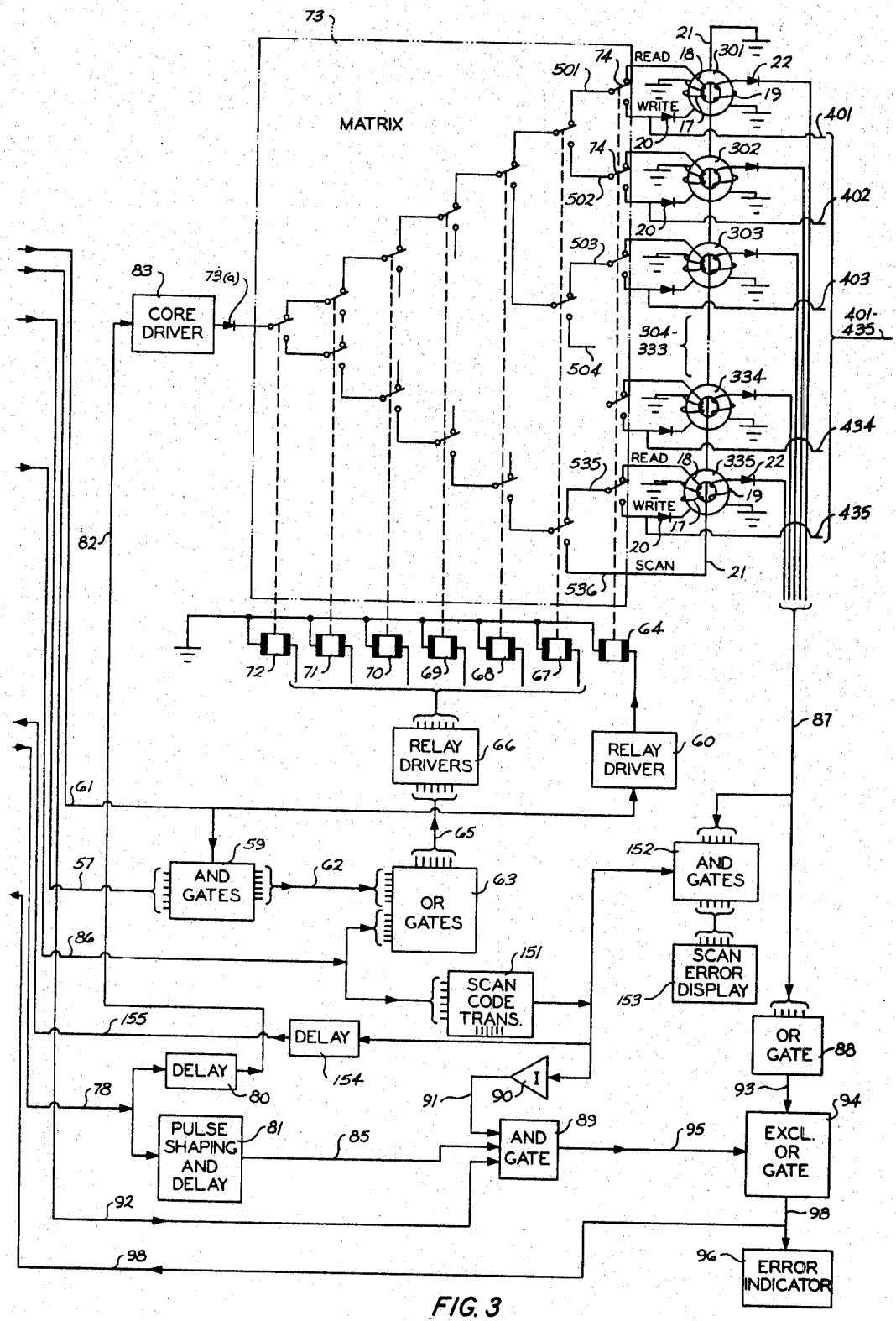
FIGS. 3 and 4 are diagrams of the electrical testing circuit.

Referring now to FIG. 3, a plurality of ferrite cores 301, 302, 303 . . . 334 and 335 are shown. Initially all the cores are in first magnetic states. Each of the cores 301, . . . , etc. has a write winding 17, a read winding 18, and a monitor winding 19. A scan winding 21 is serially connected through all the cores 301, . . . , etc. The write winding 17 of each core 301, . . . , etc. is connected by a diode 20 and a respective lead 401, 402, 403, . . . , 434, and 435 to a respective connector ( . . . , 203, . . . , 211, . . . , 234, and 235) in a connector block 15 (see FIG. 1.). Each of the connectors . . . , 203, . . . , etc. engages the upper portion of a respective terminal 101, . . . , etc. to electrically connect the write winding 17 to each core 301, . . . , etc. to a respective terminal 101, . . . , etc.

An important advantage of utilizing ferrite cores or other magnetic storage devices connected to each of the terminals to check the electrical connections between the terminals is that very large numbers of terminals can be checked with very little power being consumed. For this reason, magnetic storage devices are preferred over other memory devices which consume much more power.

When a pulse is applied through the matrix 73 to the lead 401 and the terminal 101, current pulses pass through (1) the write winding 17 on the core 301; (2) the serially connected wire 13, terminal 102, connector 202, lead 402, and write winding 17 on the core 302; and (3) the serially connected wire 14, terminal 106, connector 206, lead 406, and write winding 17 on the core (306, not shown). The cores 301, 302, and 306 change from their first magnetic states to their second magnetic states. Diodes 22 serially connected with respective monitor windings 19 of the cores 301, 302, and 306 block pulses which are induced in the monitor windings 19 when the cores 301, 302, and 306 change from their first magnetic states to their second magnetic states.

Then, the read windings 18 on the cores 301, 302, and 306 are sequentially pulsed through sequential connections made by the matrix 73 to revert from their second magnetic states back to their first magnetic states to induce output pulses in their respective monitor windings 19 which pass through the diodes 22. Diodes 20 serially connected with the write windings 17 on the respective cores 301, 302, and 306 block pulses which are induced in the write windings 17 to prevent the application of pulses to the terminals 101, 102, and 106.

If the wire 14 had been erroneously absent, sensing circuitry connected to the monitor windings 19 senses the absence of an output pulse from the monitor winding 19 on the core 306 to determine that there is an erroneous absence of an electrical connection between the terminals 101 and 106.

Next, the scan winding 21 is pulsed. If an electrical connection had been erroneously present from terminal 101 to terminal 107, the core (307, not shown) would have been placed in the second magnetic state by the pulse applied to the terminal 101. The pulse applied to the scan winding 21 reverts the core 307 from its second magnetic state to its first magnetic state to produce a pulse in its monitor winding 19. The presence of the pulse in the monitor winding 19 on the core 307 is sensed by the sensing circuitry to determine the erroneous presence of the electrical connection between the terminals 101 and 107.

Figure 4:
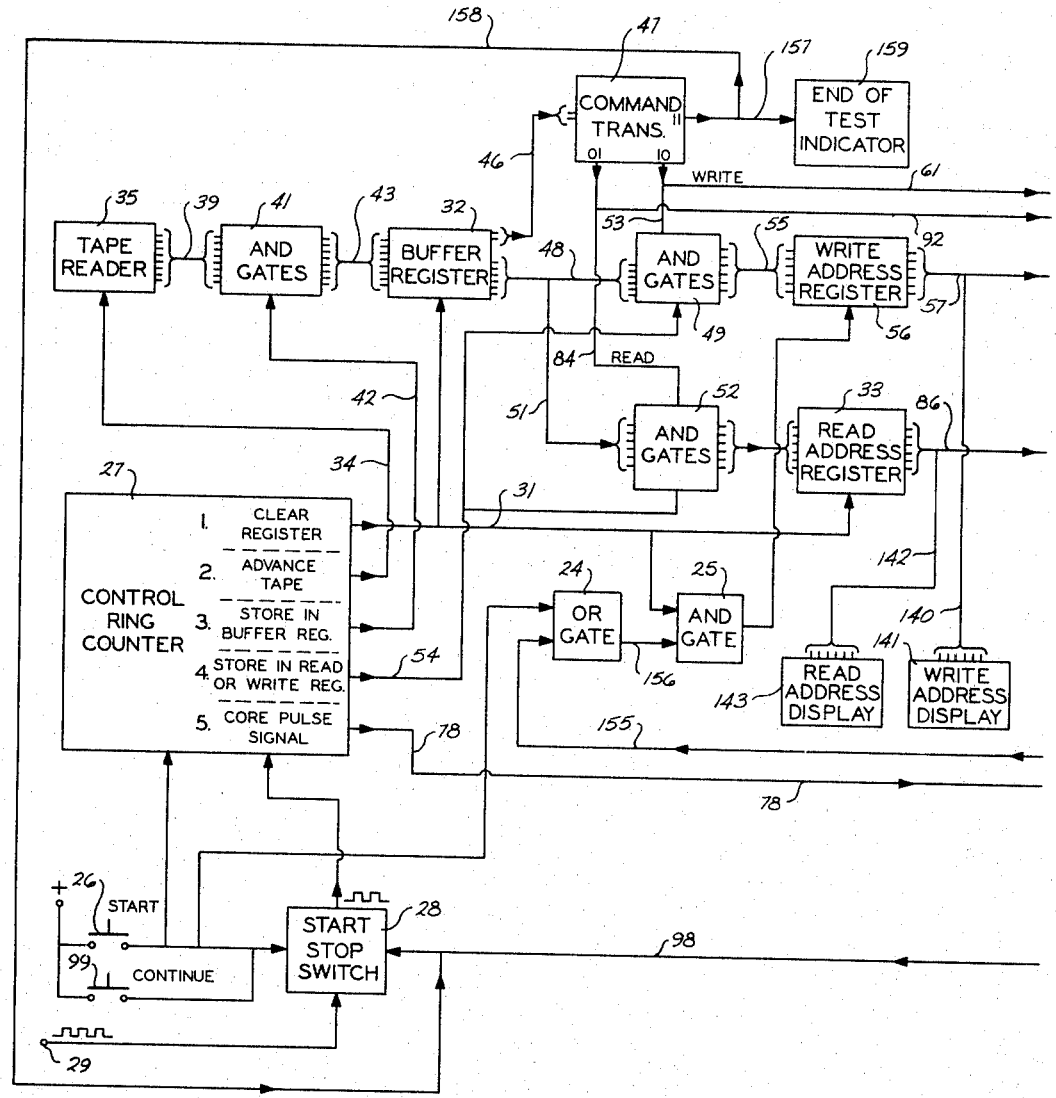

The control tape 37, shown in FIG. 2, controls the operation of the automatic circuitry in FIGS. 3 and 4 for testing the electrical connections between the terminals 101– 135 as hereinafter described. A suitable control tape may be magnetic tape having numbers recorded by magnetic impulses or punched tape having numbers recorded by perforations.

First a start switch 26 is momentarily closed to apply a signal to a control ring counter 27, a start-stop switch 28, and an OR gate 24. The signal operates the start-stop switch 28 to close a circuit from the pulse source 29 to the control ring counter 27. The signal applied to the counter 27 resets the counter 27 so that its first stage is actuated to produce an output pulse. A lead 31 from the first stage of the counter 27 applies a pulse to a buffer register 32 and a read address register 33 to clear both the registers 32 and 33. The signal applied to the OR gate 24 by the switch 26 produces an output pulse on the OR gate 24 which is applied simultaneously with the pulse from the first stage of the counter 27 to an AND gate 25. The simultaneous inputs to the AND gate 25 produce an output pulse which is applied to a write address register 56 to clear that register.

Next, a pulse from the source 29 advances the ring counter 27 so that the second stage of the counter 27 applies a pulse through a lead 34 to a tape reader 35 to advance the tape reader. The tape 37 (see FIG. 2) is advanced by the tape reader to sense a first eight digit binary number 38($a$) on the tape. The tape reader applies the eight digit number 38($a$) through eight leads 39 to respective AND gates 41.

When a pulse from the source 29 advances the counter 27 so that the third stage is excited, a lead 42 applies a pulse from the third counter stage to the plurality of AND gates 41 to open the gates 41 and pass the binary number 38($a$) through the leads 43 to the respective stages of the buffer register 32. The first two digits of the number 38($a$) are applied from the buffer register 32 to a command translator 47 by the leads 46. The remaining six digits in the buffer register 32 are applied by leads 48 to respective AND gates 49 and by leads 51 to respective AND gates 52.

Figure 2:
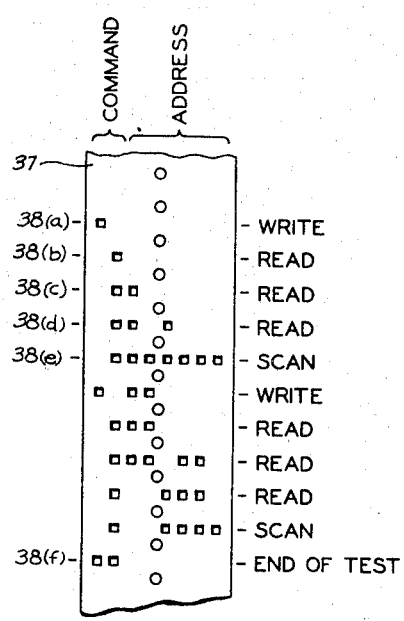
FIG. 2 shows a control tape which controls the electrical testing circuit.

As seen in FIG. 2, the first two digits of the number 38($a$) are 10. The command translator 47 senses the digits 10 to produce a write signal on a lead 53 which is applied to inputs of the respective AND gates 49. When the fourth stage of the counter 27 is actuated by a pulse from the source 29, a pulse is applied over lead 54 to the AND gates 49 and the AND gates 52. Since a pulse is applied by lead 53 to the AND gates 49, the AND gates 49 open and pass the last six digits of the number 38($a$) over leads 55 to the write address register 56. The output of the write address register 56 is applied by leads 57 to AND gates 59 (FIG. 3) and by leads 140 to a write address display 141.

The write signal from the command translator 47 is applied by a lead 61 to the AND gates 59 to open the gates 59 and pass the last six digits of the number 38($a$) over leads 62 to OR gates 63. The OR gates 63 pass the last six digits of the number 38($a$) over leads 65 to respective relay drivers 66. The relay drivers 66 actuate respective relays 67–72 to control the relay contact matrix 73 to connect an input 73($a$) of the relay matrix to one of the matrix leads 501–536 corresponding to the last six digits of the number 38($a$). Since the last six digits of the number 38($a$) are 000000, none of the relays 67–72 are excited, thus, the relay contact matrix is connected to the matrix lead 501.

Also, the lead 61 applies the write signal from the command translator 47 to a relay driver 60 which actuates the relay 64. Actuation of the relay 64 moves the contactors 74 to connect the matrix leads 501–535 to the respective leads 401, . . . , etc. Thus the number 38($a$) causes the connection of the matrix input 73($a$) to the terminal 101.

When a fifth stage of the counter 27 is actuated by a pulse from the input 29, a core pulse signal is produced on the lead 78 which is applied through a delay 80 (FIG. 3) and a lead 82 to a core driver 83. The core driver 83 applies a pulse to the input 73($a$) of the relay matrix 73 which passes the pulse to the lead 501, the lead 401, and the terminal 101. The pulse applied to terminal 101 passes through the write windings 17 of the cores 301, 302, and 306 to change their magnetic states from their first states to their second states.

A pulse from the input 29 now steps the ring counter 27 so that its first stage is again actuated. Signals from the first stage are applied through the lead 31 to clear the buffer register 32 and the read address register 33. Next, the second stage of the counter 27 is actuated to advance the tape reader 35 to sense a second eight digit binary number 38($b$). Then the third stage of the counter 27 applies a pulse through lead 42 to the AND gates 41 to store the number 38($b$) in the buffer register 32. The command translator 47 senses the first two digits of the number 38($b$) which are 01 to produce a read signal which is applied to the AND gates 52 by a lead 84.

When the fourth stage of the counter 27 is actuated, a signal is applied by lead 54 to the AND gates 52 to transfer the last six digits of the number 38($b$) to the read address register 33. The output of the read address register is applied through leads 142 to a read address display 141 and through leads 86 to the OR gates 63, the leads 65, and the relay drivers 66. Since the last six digits of the number 38($b$) are 000000, the relay contact matrix connects a path from the core driver 83 to the lead 501. There is no write signal on lead 61, and thus, the relay driver 60 does not excite the read-write relay 64 and the contactors 74 are connected to the read windings 18 of the respective cores 301, . . . , etc.

When the fifth stage of the counter 27 is actuated, a pulse is applied through the lead 78, the delay 80, and the lead 82 to the core driver 83. The core driver 83 produces a pulse which passes through the matrix 73, lead 501, contactor 74, and the read winding 18 of the core 301. The core 301 reverts from its second magnetic state to its first magnetic state to induce an output pulse in its monitor winding 19 which passes through the diode 22.

The monitor windings 19 of all the cores 301, . . . , etc. are connected by the diodes 22 and leads 87 to respective inputs of an OR gate 88 and AND gates 152. The output pulse on the monitor winding 19 of the core 301 produces a pulse on the output of the OR gate 88 which is applied by lead 93 to a first input of an EXCLUSIVE-OR gate 94. At the same time, the core pulse signal on lead 78 passes through a pulse shaping and delay circuit 81 and a lead 85 to a first input of an AND gate 89. The read signal from the command translator 47 is applied by a lead 92 to a second input of the AND gate 89. A third input of the AND gate 89 is connected by a lead 91 to the output of an inverter 90 which normally applies a signal to the third input. The AND gate 89 passes the core pulse signal to a lead 95 and to the second input of the EXCLUSIVE-OR gate 94 when both the read signal on lead 92 and the normal signal on lead 91 are present. Since there is a coincidence of signals on leads 95 and 93, the EXCLUSIVE-OR gate 94 does not produce an output pulse.

In succeeding cycles of the counter 27, the numbers 38(c) and 38(d) are sensed to control the reading of cores 302 and 306, respectively. The last six digits of the number 38(c) are 100000, and thus, the number 38(c) causes the actuation of the relay 67 to connect the input 73(a) of the matrix 73 to the matrix lead 502 to apply the core pulse to the read winding of the core 302. The last six digits of the number 38(d) are 101000, and thus, the number 38(d) causes the actuation of the relays 67 and 69 to connect the input 73(a) of the matrix 73 to the matrix lead 506 to apply the core pulse to the read winding 18 of the core 306.

If there had been an error and the electrical connection 14 between the terminals 101 and 106 had been left out, the core 106 would not have been changed to its second magnetic state by the core pulse originally applied to the terminal 101 after the number 38(a) had been sensed. An output pulse is not induced in the monitor winding 19 of the core 306 to be applied to the EXCLUSIVE-OR gate 94 when the pulse is applied to the read winding 19 of the core 306. The absence of a pulse on the lead 93 and the presence of a pulse on the lead 95 produces an output pulse from the EXCLUSIVE-OR gate 94 which is applied by the lead 98 to an error indicator 96 and the start-stop switch 28. The start-stop switch 28 opens to stop the counter 27.

An operator is apprised of the error by the error indicator 96. By reading the write address 141 and the read address 143, the operator can determine that the electrical connection 14 from terminal 101 to terminal 106 is missing. After noting or correcting the error, the operator momentarily closes the continue switch 99 to apply a signal to the start-stop switch 28 to reconnect the source 29 to the counter 27 to continue the cycling of the testing circuit.

In the following cycle, a number 38(e) is sensed by the tape reader 35. The first two digits of the number 38(e) are 01 which produces a read signal on the leads 84 and 92 from the command translator 47. The last six digits of the number 38(e) are 111111 which results in relays 67–72 being actuated to connect the input 73(a) of the matrix 73 to the matrix lead 536. The matrix lead 536 is connected to the scan winding 21 serially passing through all the cores 301, . . . , etc. Since all the cores 301, . . . , etc. are now in their first states, the pulse applied to the scan winding 21 by the core driver 83 does not induce an output pulse in any of the monitor windings 19.

The leads 86 from the read address register 33 are connected to a scan code translator 151 which produces an output signal when the six digits of the read address are 111111. The output signal of the scan code translator 151 is applied (1) to AND gates 152, (2) to the inverter 90, and (3) by a delay 154 to the OR gate 24. The output signal of the inverter 90 is absent when the output signal from the scan code translator 151 is present, and thus, the core pulse signal from the pulse shaping and delay circuit 81 does not pass through the AND gate 89 to the EXCLUSIVE-OR gate 94. With no signal on either of the leads 93 and 95, the EXCLUSIVE-OR gate 94 does not produce an error output.

If an electrical connection had been erroneously present from the terminal 101 to the terminal 107, the original pulse applied to the terminal 101 would have changed the core (307, not shown) from its first state to its second state. When a pulse is now applied to the scan winding 21, a pulse is induced in the monitor winding 19 of the core 307 and applied by a respective lead 87 to an input of the OR gate 88 and an input of a respective AND gate 152.

The output of the OR gate 88 applies a signal to the EXCLUSIVE-OR gate 94 by the lead 93. Since there is a presence of a signal on lead 93 and an absence of a signal on lead 95, the EXCLUSIVE-OR gate 94 produces an output signal indicating an error and stopping the counter 27.

The AND gates 152 are connected by leads to a scan error display 153. The erroneous signal induced in the monitor winding 19 of the core 107 is passed through the respective AND gate 152 to actuate the scan error display. The operator is then apprised of the error, and by reading the scan error display 153 and the write address display 141, the operator is able to determine that there is an erroneous connection between terminals 101 and 107.

After noting or correcting the error, the operator momentarily closes the continue switch 99 to allow the counter 27 to start cycling again. When the first stage of the counter 27 is actuated, a signal from the delay 154 is applied through the lead 155 to the OR gate 24. The output of the OR gate 24 is applied by lead 156 simultaneously with the pulse on lead 31 to the AND gate 25. The AND gate 25 produces an output pulse to reset the write address register 56 in preparation for another write operation.

The circuit continues to cycle to test for the presence and absence of other electrical connections until the number 38(f) appears at the end of the tape. The first two digits of the number 38(f) are 11 which the command translator decodes as an end of test signal. Accordingly, the number 38(f) produces a signal on leads 157 and 158 which are connected respectively to an end of test display 159 and the start-stop switch 28. The start-stop switch is opened and the operator is apprised that the test is completed and may connect the connector block 15 to another terminal board.

It is to be understood that the above-described embodiment of the invention is simply illustrative of the principles of the invention and that many modifications may be made within the scope of the invention.

What is claimed is:

1. A circuit for testing electrical connections between a plurality of terminals, wherein an electrical connection exists between a first terminal and a second terminal and no electrical connection exists between the first and a third terminal comprising:

a plurality of ferrite cores, each having a write winding, a read winding, and a monitor winding;

a scan winding serially connected through all of the plurality of cores;

a single switching matrix having a single input lead and a plurality of output leads, one output lead connected to each of the write windings, the read windings, and the scan winding;

means for connecting each of the write windings to a respective terminal, whereby the write windings on respective first, second, and third cores are connected to the respective first, second, and third terminals;

means for sequentially operating the matrix to: (1) connect the input lead of the matrix to the output lead which is connected to the write winding on the first core, whereby the input lead of the matrix is electrically connected to the first and second terminals; (2) connect the input lead of the matrix to the output lead which is connected to the read winding on the first core; (3) connect the input lead of the matrix to the output lead which is connected to the read winding on the second core; and (4) connect the input lead of the matrix to the scan winding;

means for applying (1) a first pulse to the input lead of the matrix after its connection by the matrix operating means to the write winding on the first core, (2) a second pulse to the input lead of the matrix after its connection by the matrix operating means to the read winding on the first core, (3) a third pulse to the input lead of the matrix after its connection by the matrix operating means to the read winding on the second core, and (4) a fourth pulse to the input lead of the matrix after its connection by the matrix operating means to the scan winding; and means connected to the monitor windings on the first, second, and third cores for sensing (1) the coincidence of the second pulse and a pulse induced in the monitor winding on the first core, (2) the coincidence of the third pulse and a pulse induced in the monitor winding on the second core, and (3) the absence of a pulse induced in the monitor winding on the third core during the fourth pulse, whereby the presence of the electrical connection between the first and the second terminals and the absence of an electrical connection between the first and third terminals is tested.

2. An apparatus as defined in claim 1, wherein the sensing means comprises:
   a plurality of diodes, each diode connected in series with a respective one of the monitor windings;
   an OR gate having a plurality of inputs, each input connected to a respective one of the monitor windings for producing an output pulse when a pulse of a predetermined polarity is produced in any of the monitor windings;
   AND gate means connected to the pulse applying means for passing a pulse from the pulse applying means only when the matrix input lead is electrically connected to a read winding; and
   an EXCLUSIVE-OR gate having a first input connected to the output of the OR gate and having a second input connected to the output of the AND gate means, whereby an output signal from the EXCLUSIVE-OR gate indicates an error in the electrical connections.

3. A circuit for testing electrical connections between a plurality of terminals wherein an electrical connection exists between a first terminal and a second terminal comprising:
   a plurality of ferrite cores, each having a write winding, a read winding, and a monitor winding;
   a switching matrix having an input lead and a plurality of output leads, one output lead connected to each of the write windings and read windings;
   means for connecting each of the write windings to a respective terminal, whereby the write windings on respective first and second cores are connected to the respective first and second terminals;
   means for sequentially operating the matrix to: (1) connect the input lead of the matrix to the output lead which is connected to the write winding on the first core, whereby the input lead of the matrix is electrically connected to the first and second terminals, (2) connect the input lead of the matrix to the output lead which is connected to the read winding on the first core, and (3) connect the input lead of the matrix to the output lead which is connected to the read winding on the second core;
   means for applying (1) a first pulse to the input lead of the matrix after its connection by the matrix operating means to the write winding on the first core, (2) a second pulse to the input lead of the matrix after its connection by the matrix operating means to the read winding on the first core, and (3) a third pulse to the input lead of the matrix after its connection by the matrix operating means to the read winding on the second core;
   a plurality of diodes, each diode connected in series with a respective one of the monitor windings;
   an OR gate having a plurality of inputs, each input connected in series with a respective one of the monitor windings for producing an output pulse when a pulse of a predetermined plurality is produced in any one of the monitor windings;
   AND gate means connected to the pulse applying means for passing a pulse from the pulse applying means only when the matrix input lead is electrically connected to a read winding; and
   an EXCLUSIVE-OR gate having a first input connected to the output of the OR gate and having a second input connected to the output of the AND gate means, whereby an output signal from the EXCLUSIVE-OR gate indicates an error in the electrical connections.

References Cited

UNITED STATES PATENTS 3,246,240   4/1966   Arnold et al. _____ 324—73

RUDOLPH V. ROLINEC, *Primary Examiner.*

E. L. STOLARUN, *Assistant Examiner.*

U.S. Cl. X.R.

324—51, 111